(12) United States Patent
Burkart et al.

(10) Patent No.: US 7,117,508 B2
(45) Date of Patent: Oct. 3, 2006

(54) DISK PLAYER

(75) Inventors: Harald Burkart, Villingen-Schwenningen (DE); Nicolas Martz, ShenZhen (CN)

(73) Assignee: Thomson Licensing, Boulogne-Billancourt (FR)

( * ) Notice: Subject to any disclaimer, the term of this patent is extended or adjusted under 35 U.S.C. 154(b) by 362 days.

(21) Appl. No.: 10/497,892

(22) PCT Filed: Nov. 22, 2002

(86) PCT No.: PCT/EP02/13113

§ 371 (c)(1),
(2), (4) Date: Jun. 4, 2004

(87) PCT Pub. No.: WO03/049102

PCT Pub. Date: Jun. 12, 2003

(65) Prior Publication Data

US 2005/0015786 A1    Jan. 20, 2005

(30) Foreign Application Priority Data

Dec. 5, 2001    (EP) .................................. 01403129

(51) Int. Cl.
*G11B 17/03*    (2006.01)
(52) U.S. Cl. .................................................... 720/607
(58) Field of Classification Search ...................... None
See application file for complete search history.

(56) References Cited

U.S. PATENT DOCUMENTS 4,866,693 A    9/1989    Odawara et al.

6,169,711 B1    1/2001    Koh

FOREIGN PATENT DOCUMENTS

EP    0697693    2/1996

OTHER PUBLICATIONS

Copy of search report dated Mar. 7, 2003.

*Primary Examiner*—David Davis
(74) *Attorney, Agent, or Firm*—Joseph J. Laks; Harvey D. Fried; Christine Johnson

(57) ABSTRACT

A disk player, e.g. for a CD or DVD, generally includes a tray receiving the disk to be scanned and a so-called cam slider moved between an IN-position for purpose of scanning and an OUT-position for purpose of loading the disk. Therein the movements and the end positions of the tray and the cam slider have to be monitored for proper operation. To do this generally several switches or a special complicated switch are needed. It is an object to simplify the means for performing said monitoring operations for movements in different directions and especially to achieve this by means of a single simple switch, only. The cam slider is provided with a chamfer for moving a switch lever of the switch into a first position (a) and further is provided with a control lever including a switch actuating area for moving said switch lever into a second position (b) said control lever being pivotally mounted on the cam slider against the action of a spring. By this solution it is achieved that movements in different directions can be monitored by a single simple switch only.

12 Claims, 5 Drawing Sheets

DISK PLAYER

Figure 1:
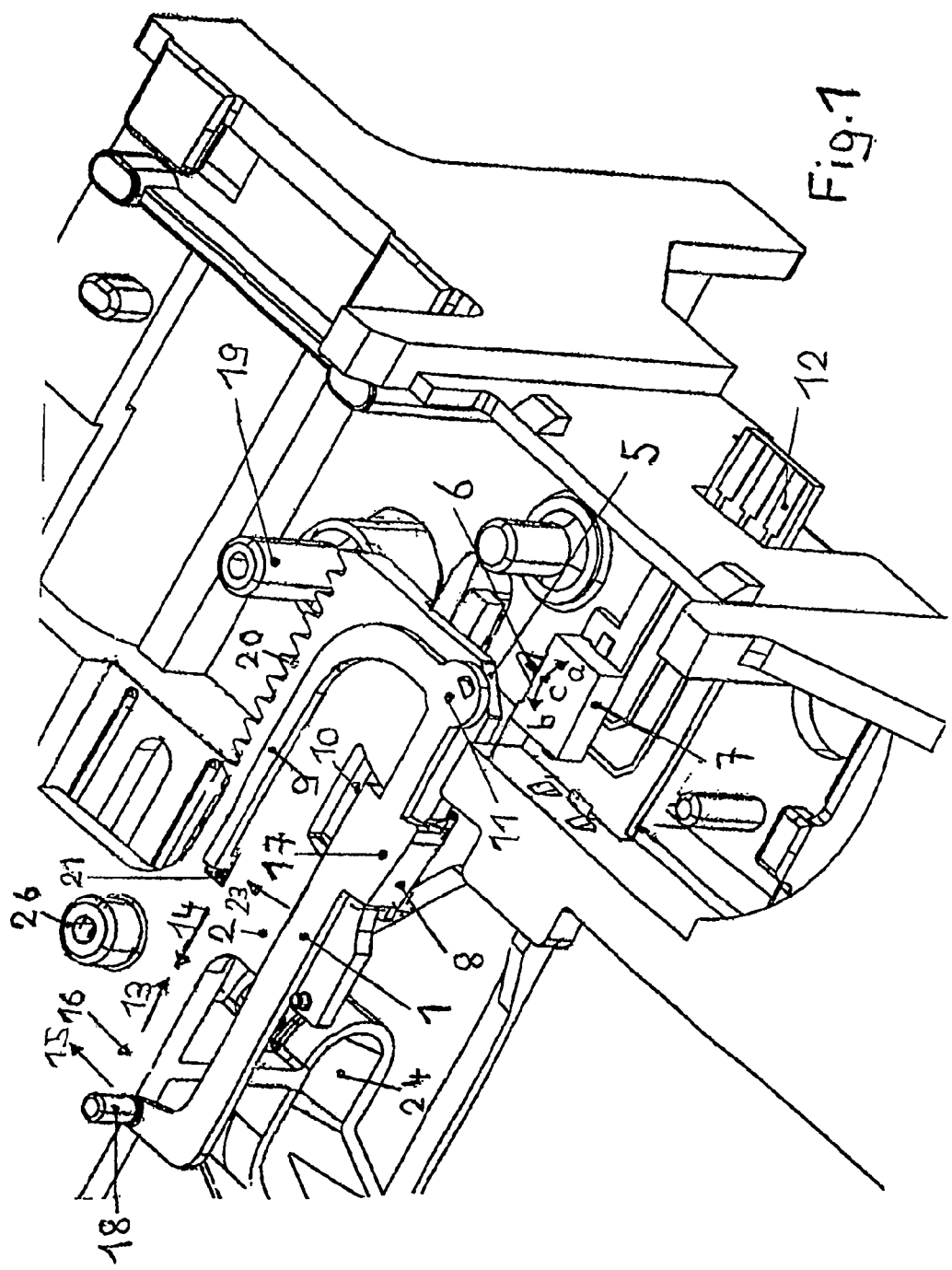

This application claims the benefit, under 35 U.S.C. § 365 of International Application PCT/EP02/13113, filed Nov. 22, 2002, which was published in accordance with PCT Article 21(2) on Jun. 12, 2003 in English and which claims the benefit of European patent application No. 01403129.8, filed Dec. 5, 2001.

The present invention relates to a disk player according to the preamble of claim 1, particularly it concerns means for loading a disk into a playback position and for generating control signals indicating the end positions of the loading movement of the tray into the cabinet of the player and the corresponding opposite movement of the tray outside the cabinet of the player.

A disk player generally includes a so-called cam slider coupled with the tray receiving the disk to be scanned. In operation the cam slider and the tray are moved by a motor between an end OUT position for loading a disk and an end IN position for scanning the disk, e.g. by an electronic laser pick-up unit. For proper operation it is necessary to monitor both the direction of movement of the cam slider and the associated tray and also the reaching of the respective end positions of said movements in order to switch off the corresponding driving motor and to proceed with the next step of operation if an end position of the respective movement has been reached. Generally the cam slider and the tray perform movements in directions which are perpendicular to each other.

To do this generally several switches or a rather complicated special switch are needed for monitoring direction of the movements and end positions in the first and in the second direction of said movements.

It is an object of the present invention to simplify the means for monitoring the direction and the end positions of said movements and especially to achieve both with a single simple switch, only. This object is achieved by the features cited in claim 1. Advantageous embodiments and further developments of the invention are cited within the dependent claims.

Thus according to the present invention said cam slider is provided with a chamfer for moving a switch lever of the switch into a first position and further is provided with a control lever including a switch actuating area for moving said switch lever into a second position said control lever being rotably mounted at the cam slider against the action of a spring.

The solution according to the invention represents several advantages. First, all necessary monitoring operations for several movements and the end positions are performed by a single simple switch, only. Thereby the number of components, the time for assembling and the costs of the structure are considerably decreased whereby also the reliability of the total structure is increased. In fact, by the combined action of the cam slider and of the control lever a single simple switch is enabled to detect both the direction and the end positions of the tray though the direction of movements of the tray and the cam slider are perpendicular to each other.

According to one embodiment of the invention a first end of the control lever is coupled with the tray and a second end of the control lever is coupled with the cam slider via a resilient spring member. Preferably the first end of the control lever is provided with a pin engaging a groove within the tray. Thereby it is achieved in a simple manner that the tray is enabled to effect a rotational movement of the control lever if the tray approaches its end OUT-position.

According to another embodiment of the invention the resilient spring member is realized by a resilient spring lever forming an integral part of the control lever, the end of said spring lever being fastened to the cam slider. Preferably the spring lever is provided with a hook-like end engaging an opening within the cam slider. Thereby the spring action needed for proper operation of the control lever is achieved without needing further components. Particularly a separate spring for achieving the spring action is not needed.

According to another embodiment of the invention the switch actuating area of the control lever has the form of a rectangular surface being inclined and being displaced with respect to the chamfer in the moving directions of the cam slider. Thereby the switch actuating area is enabled to turn the switch lever into a first position during movement of the cam slider into the OUT direction and thereafter into a second position during the movement of the cam slider in the IN direction.

According to a further embodiment of the invention the control lever is coupled with the tray in such a way that at the end of the moving operation of the cam slider into the OUT direction the switch actuating area is moved away from the switch lever against the action of the spring so that the switch lever is released by the switch actuating area and therefore can return to its central position.

According to a further embodiment of the invention the switch is provided with three outputs indicating a first end position, a second end position and a central position, respectively, of the switch lever of the switch. By indication of not only the two end positions but also of the idle or central position of the switch the reliability of the control operations can be improved.

Figure 2:
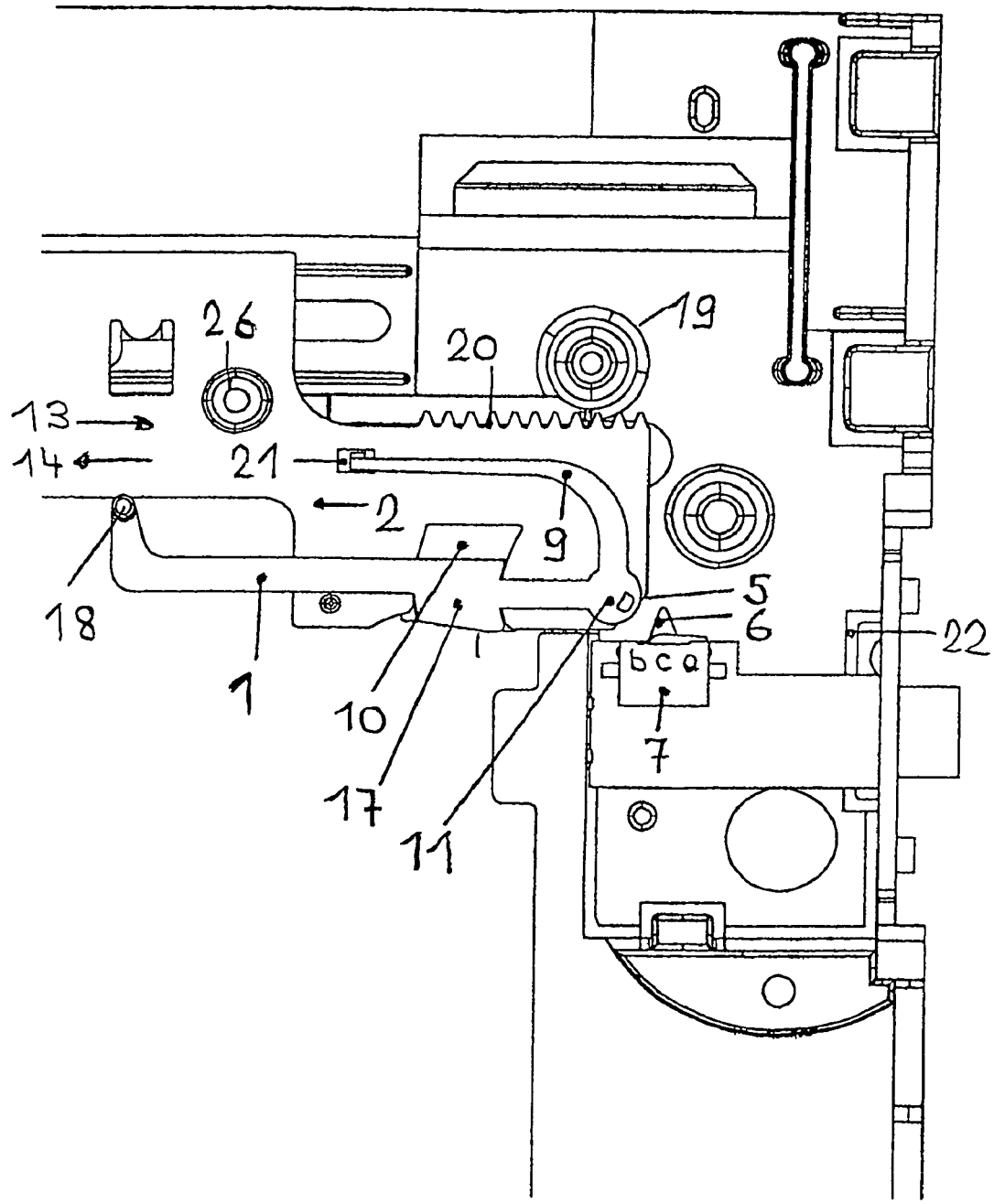
Figure 3:
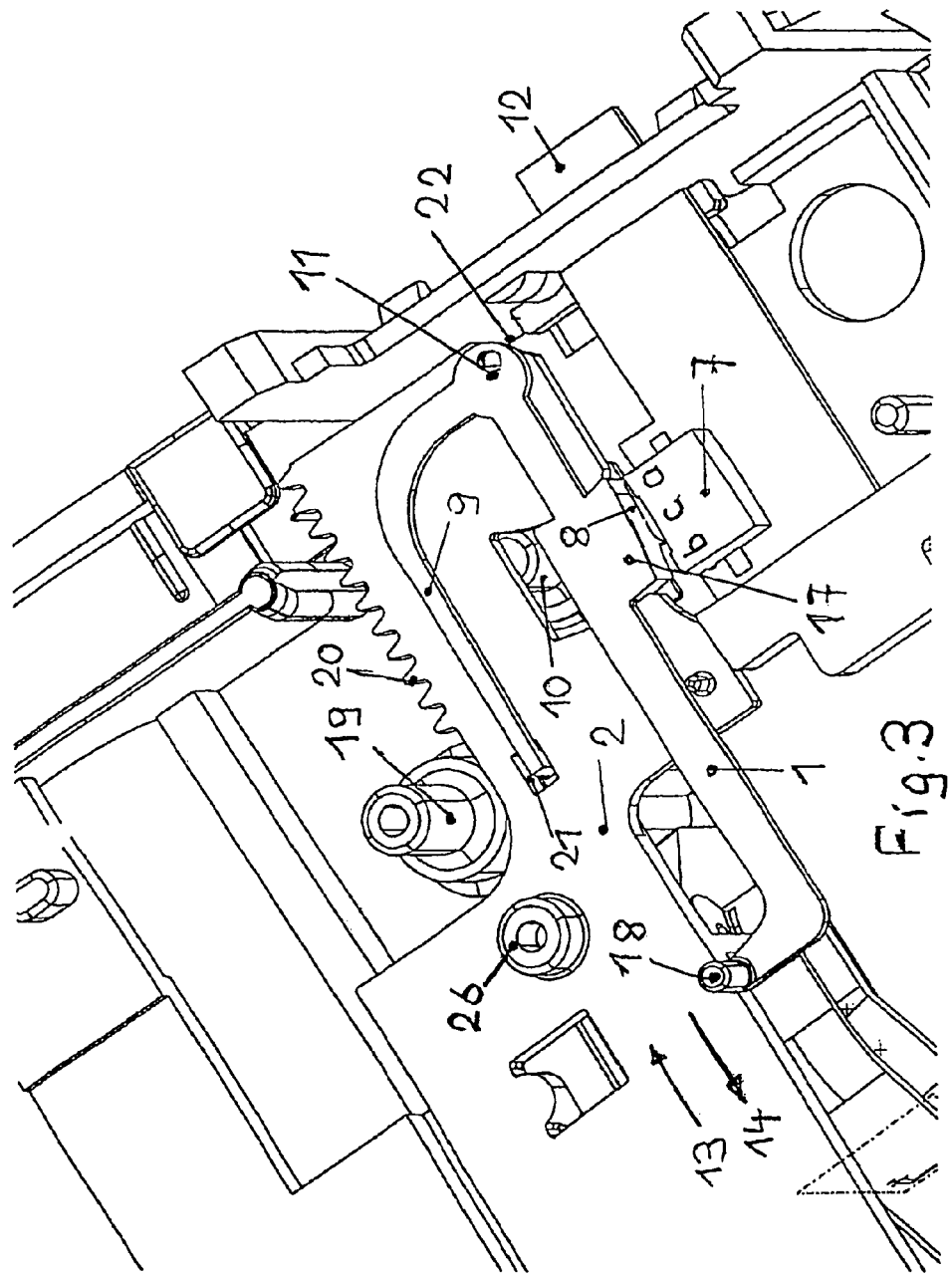
Figure 4:
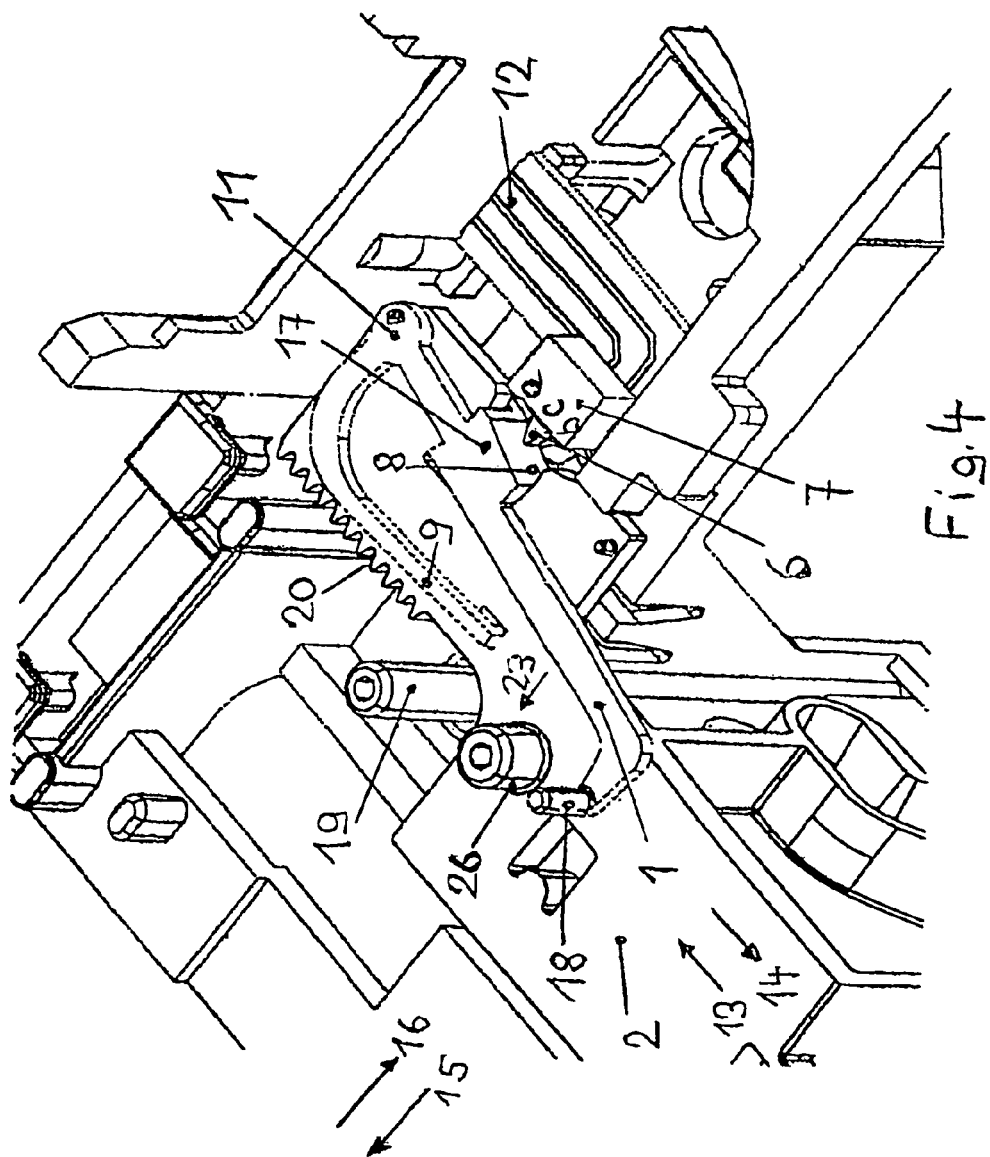
Figure 5:
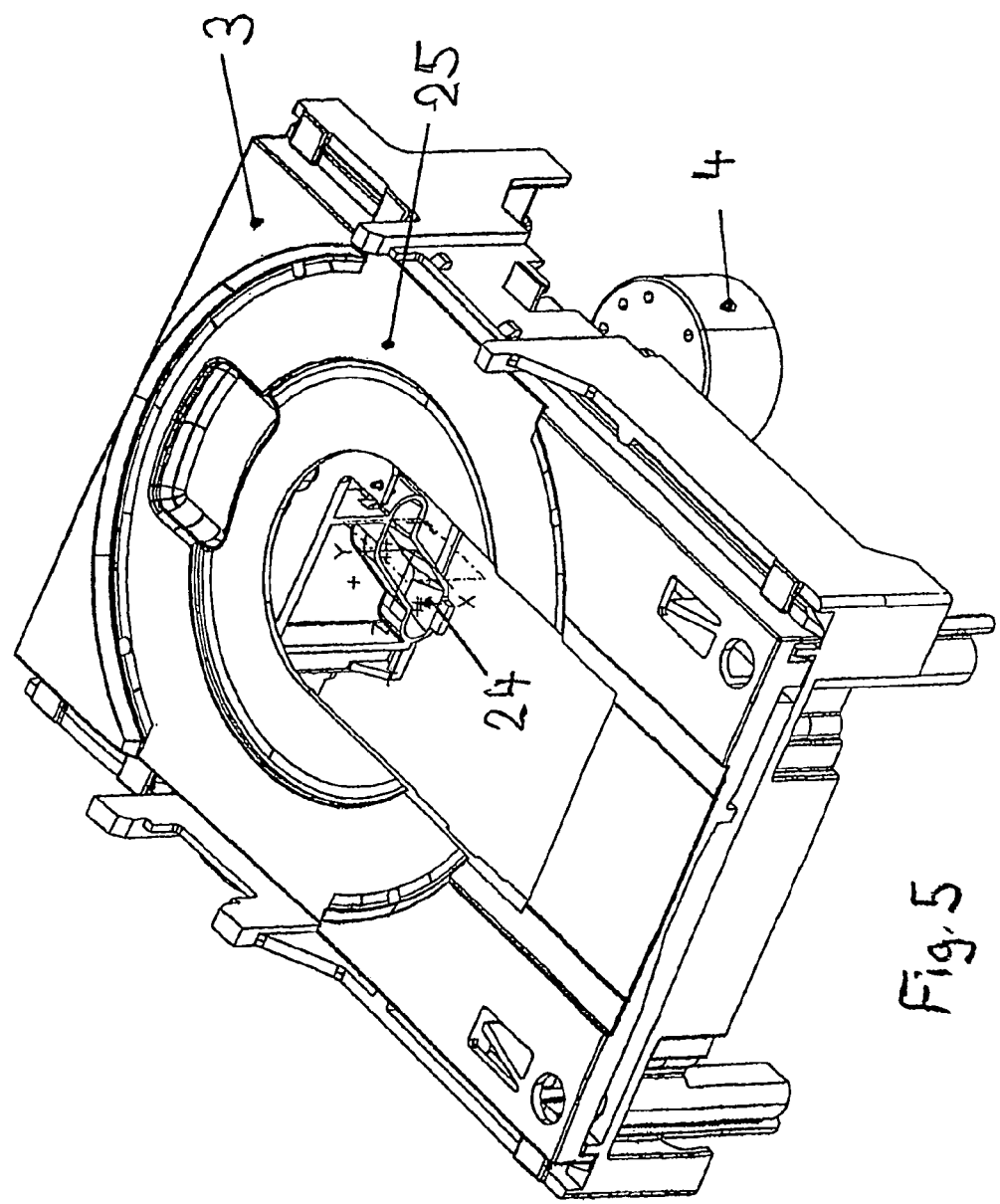

In the following the invention will be described by way of some example embodiments of the invention explained within the following description and the accompanying drawing. Within the drawing FIG. 1 is a perspective view of a disk player according to the present invention, FIG. 2 is a top view of the player shown in FIG. 1 with the cam slider in its end IN position, FIG. 3 is a top view like FIG. 2 with the cam slider in its end OUT position, FIG. 4 is a perspective view of FIG. 3 wherein the switch lever is released by the switch actuating area of the control lever and FIG. 5 is a perspective view of the disk player also showing the tray and the driving motor.

FIG. 1 shows the so-called cam slider 2 coupled with the tray (not shown) and being arranged movably for a translatory movement in directions 13 and 14. The movement in direction 13 is into the OUT position wherein the tray lies outside the cabinet of the player so that a disk can manually be inserted or loaded into the tray. The movement in direction 14 is into the IN-position wherein the tray is drawn into the cabinet of the player so that the disk, e.g. a CD or a DVD, can be scanned by a scanning unit like an optical laser scanner for purpose of playback. If cam slider 2 moves in OUT direction 13 then tray moves in direction 15. Said movements are achieved by a motor (not shown) engaging via a pinion 19 a toothed rack 20 of the cam slider 2. Above the cam slider 2 a control lever 1 is provided which terminates into a resilient spring lever 9 yielding a spring action and having an hook-like end engaging an opening 21 within the cam slider 2. An enlarged portion 17 of control lever 1 rests within an opening 10 of cam slider 2 in such a way that control lever 1 can be pivoted against the spring action of spring lever 9 in direction 23 around a turning point 11. One end of cam slider 2 is provided with a chamfer 5. Additionally control lever 1 carries an inclined switch actuating area 8 at an outer wall of the enlarged portion 17.

Furthermore the chassis of the player includes a switch 7 with a switch lever 6. The switch lever 6, if not actuated, assumes an idle or central position c and can be pivoted into two end positions a and b. Three outputs of switch 7 are connected to a PCB (printed circuit board) 12 being connected to a central control electronic (not shown). The purpose of the cam slider 2 is to monitor the end positions of movement of the tray in directions 15, 16 by properly actuating switch 7. The purpose of switch 7 is to monitor the end positions of the tray when moved in directions 15 and 16. Furthermore the cam slider 2 causes that by means of the curved structure 24 the so-called mechadeck, i.e. the playback electronic of the CD or DVD player, is lifted or lowered. If the tray moves into OUT-direction 15 the playback electronic together with the disk is lowered or moved downwards.

The operation of said structure is as follows:

FIG. 1 shows the structure in its IN-position. Switch 7 is not actuated by cam slider 2 and switch lever 6 remains in its central position c. As the tray begins its movement into the OUT direction 15 it will move the cam slider 2 in the direction 13 by disengaging the pin 26. If cam slider 2 is moved in direction 13 towards its OUT-position then chamfer 5 at cam slider 2 first abuts switch lever 6 and turns it into position a. This signalizes via the PCB 12 to the central electronic circuit that now cam slider 2 is moving in direction 13 towards the OUT position. If cam slider 2 further moves in direction 13 switch lever 6 is hold in its position a by the area of cam slider 2 adjacent to chamfer 5 between chamfer 5 and opening 10. If cam slider 2 further moves in direction 13 switch lever 6 will come into contact with the switch actuating area 8 of control lever 1 until the end position of cam slider 2 has been reached, the cam slider 2 abutting a stopper at the chassis of the player. The tray (not shown), however, is further moved in OUT direction 15. For enabling this the driving mechanism between the motor and the cam slider 2 is designed in such a way that at the right end position of cam slider 2 the positive coupling between the pinion 19 of the motor and the cam slider 2 is automatically suspended. That means the motor can continue rotating and driving the tray in direction 15 though the cam slider 2 cannot be moved further in direction 13. The tray is provided with a V-like groove engaging pin 18 of cam slider 2. When the end position of the tray is being reached the tray turns control lever 1 via pin 18 substantially about turning point 11 in direction 23 wherein the enlarged portion 17 can move within opening 10 of cam slider 2. By this turning operation of control lever 1 the resilient spring lever 9 is bent or deformed and thereby the switch actuating area 8 is moved away from switch 7 so that switch lever 6 is released and turns back into its center position c. Thereby it is signalized via PCB 12 to the control electronic that the final end OUT position of the tray has been reached and thus energizing of a driving motor has to be switched off and the player can proceed with the next step of operation.

FIG. 2 shows substantially the same structure as FIG. 1 in a top view. Cam slider 2 is within the IN-position and not yet moved in direction 13 towards the OUT position. Thus switch lever 6 is not yet actuated and remains in the central position c.

FIG. 3 shows the end OUT position of cam slider 2 after movement in direction 13. The end of cam slider 2 at the chamfer 5 abuts a stopper 22 at the chassis of the player. The switch lever 6 (not visible in FIG. 3) further remains in its right position a by action of switch actuating area 8. However, the position shown in FIG. 3 is not yet the end OUT position of the tray itself which actually has to be monitored.

FIG. 4 shows the end position of the tray. As described above the tray has continued moving in direction 15 and control lever 1 has been turned by the tray via pin 18 in direction 23 about turning point 11 so that the switch lever 6 is released by switch actuating area 8 and switch lever 6 assumes its central position c signalizing to the central control electronic that the tray has reached its end OUT position and the corresponding driving motor has to be switched off. A comparison between FIGS. 3 and 4 shows the turning operation of control lever 1 caused by the tray as well as the deformation of spring lever 9.

If now, in opposite direction, the tray and the cam slider 2 will move in directions to IN position, i.e. directions 14 and 16, tray will begin to move first and control lever 1 becomes no more influenced by the tray. Due to the spring action of spring lever 9 the switch actuating area 8 is again moved towards switch 7 and it turns switch lever 6 into position b. Thereby it is signalized to the central control electronic that tray is moving in the IN direction 16. When the tray engages the pin 26 the cam slider 2 moves in the IN direction 14. During this movement the switch lever 6 remains turned into position b until chamfer 5 again releases switch lever 6 as shown in FIG. 1. Then the switch lever 6 turns into its central position c signalizing to the central control electronic that the end IN position of tray and cam slider 2 have been reached. It is apparent that advantageously it is achieved that movements in opposite directions and the reaching of the two end positions OUT and IN are monitored by the single switch 7 having three positions.

FIG. 5 finally shows the tray 3 with the area 25 for receiving the disk and the driving motor 4 not shown in the previous Figures and the curved structure 24 described in connection with FIG. 1.

The invention claim is:

1. Disk player with means for loading a disk into a playback position including a movable cam slider coupled with a tray receiving the disk and being movable into an OUT direction and into an IN-direction and actuating a switch for generating control signals indicating the end positions of the tray, wherein said cam slider is provided with a chamfer for moving a switch lever of the switch into a first position (a) and further is provided with a control lever including a switch actuating area for moving said switch lever into a second position (b) said control lever being pivotably mounted at the cam slider against the action of a spring.

2. Disk player according to claim 1, wherein a first end of the control lever is coupled with the tray and that a second end of the control lever is coupled with the cam slider via a resilient spring member.

3. Disk player according to claim 2, wherein the first end of the control lever is provided with a pin engaging a groove within the tray.

4. Disk player according to claim 2, wherein the resilient spring member is realized by a resilient spring lever forming an integral part of the control lever the end of said spring lever being fastened to the cam slider.

5. Disk player according to claim 4, wherein the spring lever is provided with a hook-like end engaging an opening within the cam slider.

6. Disk player according to claim 1, wherein the switch actuating area has the form of a rectangular surface being inclined and being displaced with respect to the chamfer in moving directions of the cam slider.

7. Disk player according to claim 6, wherein the rectangular surface is formed by an outer wall of the enlarged portion of the control lever.

8. Disk player according to claim 1, wherein the control lever is provided with an enlarged portion resting within an opening of the cam slider for enabling a pivotal movement of the control lever with respect to the cam slider.

9. Disk player according to claim 1, wherein the control lever is coupled with the tray in such a way that at the end of the moving operation of the cam slider into the OUT direction the switch actuating area is moved away from the switch lever against the action of the spring so that the switch lever is released by the switch actuating area.

10. Disk player according to claim 1, wherein the tray and the cam slider are driven by the same motor.

11. Disk player according to claim 10, wherein the driving shaft of the driving motor is coupled to the cam slider in such a way that at the end OUT position of the cam slider the positive coupling between the driving shaft and the cam slider is suspended so that the motor can continue moving the tray though the cam slider has reached its end OUT position.

12. Disk player according to claim 1, wherein the switch is provided with three outputs indicating a first end position (a), a second end position (b) and a central position (c), respectively, of a switch lever of the switch.

* * * * *